United States Patent [19]

Bobb et al.

[11] 4,056,290

[45] Nov. 1, 1977

[54] METHOD OF CHANGING THE FREQUENCY OF A LASER BEAM

[75] Inventors: Lloyd C. Bobb, Willow Grove; Kimball Kramer, Philadelphia, both of Pa.

[73] Assignee: The Government of the United States as represented by the Secretary of the Army, Washington, D.C.

[21] Appl. No.: 667,911

[22] Filed: Mar. 18, 1976

[51] Int. Cl.² ............................................. H02M 5/04
[52] U.S. Cl. .................................... 307/88.3; 363/157
[58] Field of Search ...................... 307/88.3; 321/69 R

[56] References Cited

U.S. PATENT DOCUMENTS 3,670,258   6/1972   Magnante ...................... 307/88.3 X Primary Examiner—R. V. Rolinec
Assistant Examiner—Darwin R. Hostetter
Attorney, Agent, or Firm—Nathan Edelberg; Arthur I. Spechler; Robert P. Gibson

[57] ABSTRACT

The frequency of a laser beam can be changed by directing the laser beam through a crystal that has paraelectric and ferroelectric states, above and below a Curie transition temperature, respectively. The crystal is maintained at a constant temperature slightly above its Curie transition temperature when no change in the frequency of the laser beam is desired; and a voltage is applied across the crystal to drive it from its paraelectric into its ferroelectric state when a relatively large change in the frequency of the laser beam is desired.

7 Claims, 1 Drawing Figure

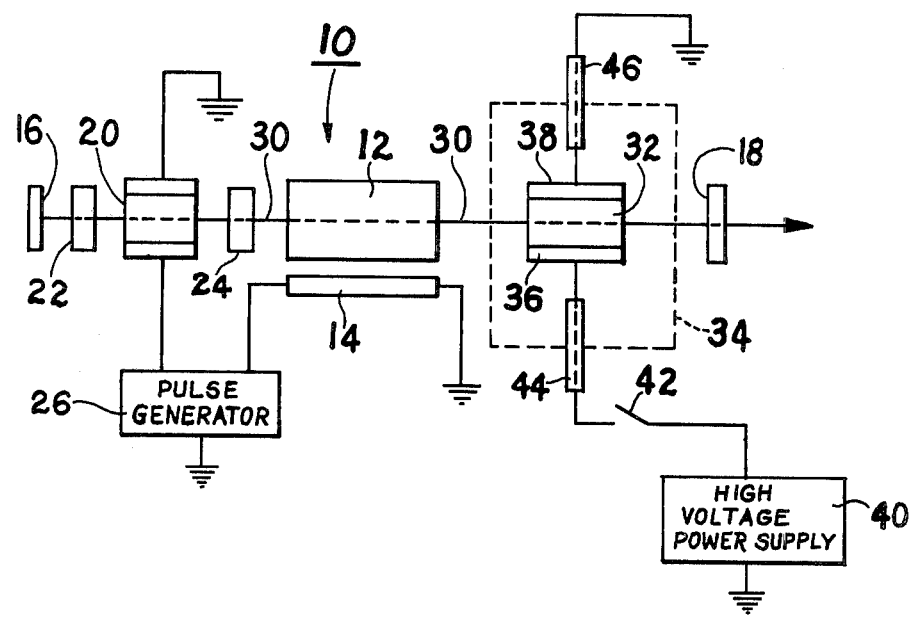

METHOD OF CHANGING THE FREQUENCY OF A LASER BEAM

The invention described herein may be manufactured, used and licensed by or for the Government for governmental purposes without the payment to us of any royalty thereon.

This invention relates generally to a method of changing the frequency of a laser beam. More particularly, the invention relates to a method of changing the frequency, $\omega_1$, of a laser beam to a frequency $\omega_1 \pm \omega_2$, where the frequency $\omega_2$ is that generated by radiations induced by an electric field applied across a single crystal to switch the crystal from a paraelectric state into a ferroelectric state while the laser beam is passing through the crystal. The novel method is particularly, though not exclusively, useful for coding a laser beam to avoid duplication of the beam, as may be required in a military laser designation system.

It has been proposed to change (or tune) the frequency of a laser beam either by magnetic means (spin-flip scattering), or angle tuning (dye lasers), or temperature tuning (parametric oscillators), or current tuning (diode lasers). These prior-art methods have the disadvantages of being either relatively slow, requiring relatively large magnetic fields, tuning over a relatively limited frequency range, or requiring cryogenic temperatures. It has also been proposed to change the frequency of a laser beam while passing through a piezoelectric crystal by changing the index of refraction of the crystal with an electric field; but the tuning (frequency) range of this prior-art method is relatively small. In accordance with the novel method of the present invention, the frequency of a laser beam can be changed by a frequency that is either the electric-field induced Raman emission or the electric-field induced harmonic generation of a single crystal that has been switched through its Curie transition temperature, from its paraelectric to its ferroelectric state. The advantages of the novel method over the aforementioned prior-art methods are (1) electric fields are easily obtained and applied, (2) the frequency change is substantially instantaneous, and (3) the range of induced frequencies can be relatively very large, that is, as large as the available phonon frequencies (eg. 3000cm$^{-1}$).

The novel method can be employed in any laser system wherein an active laser element is energized to produce a laser beam of substantially one frequency, $\omega_1$. Briefly stated, the novel method of changing the frequency $\omega_1$ of a laser beam by a frequency $\omega_2$ comprises (1) disposing a single crystal, having paraelectric and ferroelectric states above and below a Curie point, respectively, in the path of the laser beam, (2) maintaining the crystal at a substantially constant temperature just above its Curie point, and (3) applying a voltage across the crystal to drive it from its paraelectric into its ferroelectric state and generate radiations of frequency $\omega_2$. In the ferroelectric state, under conditions stated, the crystal is capable of generating stimulated Raman emissions as well as the harmonic radiation of the incident laser beam.

The novel features of the present invention are set forth with particularity in the appended claims. The invention itself, however, both as to its organization and operation, together with its objects and advantages can best be understood by reference to the following description, taken in conjunction with the accompanying drawing in which the single figure is a schematic drawing of a laser system with component parts for carrying out the novel method of the present invention.

Referring now to the drawing, there is shown a laser system 10 wherein an active laser element 12, such as a ruby or Nd:YAG rod, for example, is disposed to be energized by a flash lamp 14, in a manner well known in the laser art. A resonant cavity for the laser beam is formed by a rear totally reflecting mirror 16 and a front partially reflecting and partially light-transparent mirror 18.

Gating means to Q-switch the laser beam on are provided by a Pockels cell 20 and a pair of crossed polarizers 22 and 24 on opposite sides, respectively, of the Pockels cell 20. The Pockels cell 20 and crossed polarizers 22 and 24 are disposed in the laser cavity between the mirror 16 and the laser element 12. Both the Pockels cell 20 and the flash lamp 14 may be energized from the same power source, such as a pulse generator 26. The pulse generator 26 may contain a delay line (not shown) in the circuit to the Pockels cell 20 to delay applying a voltage thereto so as to gate a laser beam 30 in the resonant cavity while the laser element 12 is being energized by the flash lamp 14.

The laser beam 30 thus far described will have a frequency $\omega_1$ dependent upon the nature of the active laser element 12. In order to change the frequency $\omega_1$ of the laser beam 30 by a frequency $\omega_2$, a crystal 32, of single-crystal structure, having a Curie point (transitional temperature point) and paraelectric and ferroelectric states above and below, respectively, the Curie point, is disposed in the path of the laser beam 30. The crystal 32 can preferably be disposed within the resonant cavity, as shown, or disposed outside of it. Suitable crystals 32 comprise barium titanate, potassium niobate, lead titanate, and strontium titanate, for example.

The crystal 32 is disposed so that the laser beam 30 is parallel to its cubic axis and passes therethrough. The crystal 32 should possess a cubic crystal structure with inversion symmetry and be inactive in its paraelectric state. In its ferroelectric state, the crystal 32 possesses a tetragonal crystal structure and is capable of generating stimulated Raman emissions of a frequency $\omega_2$. Means are provided to maintain the temperature of the crystal 32 at a substantially constant temperature, that is, just above its Curie point. For example, if the crystal 32 is barium titanate, its Curie temperature is 120° C and it would be maintained at a temperature in a range between 120° C and about 125° C by any suitable heating (or temperature-control) means known in the art, and represented by the dashed lines 34 in the drawing. Thus, by maintaining the temperature of the crystal 32 slightly above its Curie point, it is maintained in its paraelectric state, and the laser beam 30 can pass through the crystal 32 and out through the mirror 18 without undergoing any change in its original frequency $\omega_1$.

Means are provided to drive the crystal 32 from its paraelectric state into its ferroelectric state so as to change the frequency of the laser beam 30 passing therethrough. To this end, a pair of electrodes 36 and 38 are disposed on opposite sides of the crystal 32 to apply a voltage across the crystal 32 transverely to the direction of the laser beam 30. The electrodes 36 and 38 are connected in series with a source 40 of high voltage (1–10KV) and a switch 42 (through suitable insulators 44 and 46). The high voltage source 40 may also be derived from the same power source used for the pulse generator 26. In accordance with the novel method, the heated crystal 32 is converted from its paraelectric state to its ferroelectric state by the application of a voltage of suitable value thereacross. Hence, for example, by closing the switch 42 and applying a voltage of about 6KV across the crystal 32, the Curie point of the crystal 32 is raised and its state changes from paraelectric to ferroelectric. The nearer the temperature of the crystal 32 is to its Curie point, the less voltage is necessary to drive it from its paraelectric into its ferroelectric state. When in the ferroelectric state, the crystal 32 generates stimulated Raman emissions of frequency $\omega_2$ which change the frequency of the laser beam 30 to $\omega_1 \pm \omega_2$. The frequency $\omega_2$ may also arise from harmonic generation, as will be explained hereinafter.

The operation of the laser system 10, in accordance with the novel method, will now be described. If conventional operation of the laser system 10 is desired, the switch 42 is opened, the laser element 12 is energized by the flash lamp 14, the Pockels cell is energized, and the laser beam 30 is Q-switched on. Under these conditions, the laser beam 30 passes, unchanged in frequency, through the crystal 32 with the latter in the Raman inactive state. When it is desired to change the frequency of the laser beam 30, the switch 42 is closed, and a voltage of sufficient amplitude is applied across the heated crystal 32 to drive it from its paraelectric state into its ferroelectric state. Under these conditions, the laser beam 30 of frequency $\omega_1$ couples to the vibrational modes of the crystal 32, and the frequency $\omega_1$ of the laser beam 30 is changed by the frequency $\omega_2$ of the vibrational modes. Hence the frequency of the laser beam 30 emerging from the crystal 32 is $\omega_1 \pm \omega_2$. A suitable filter of the types well known in the laser art can select the frequency $\omega_1 + \omega_2$ or the frequency $\omega_1 - \omega_2$.

In an example of a laser system 10, where the crystal 32 is a 1cm cube of barium titanate of single-crystal structure, maintained at a temperature of about 122° C, the crystal 32 can be switched from its paraelectric state to its ferroelectric state by applying a voltage of about 5KV thereacross. Under these conditions, the frequency of a laser beam 30 can be changed by about 500 wave numbers.

In theory, when an electric field is applied to a material, the material becomes polarized due to its susceptibility. The general expression can be written as follows:

$$\overline{P} = X\overline{E}_1 + X^{NL}\overline{E}_1\overline{E}_2 +$$

The first term is the usual linear susceptibility and the second is the lowest order nonlinear susceptibility. The nonlinear susceptibility is a small number ($\sim 10^{-12}$ m/v); therefore large electric fields are necessary to make the effect of this nonlinearity apparent. The effect of the nonlinearity is to mix the two electric fields $\overline{E}_1$ and $\overline{E}_2$. When this occurs radiation is emitted at the sum ($\omega_1 + \omega_2$) and difference ($\omega_1 - \omega_2$) frequencies of the two fields $\overline{E}_1$ and $\overline{E}_2$. When $\overline{E}_1$ and $\overline{E}_2$ are at the same frequency the sum frequency is the first harmonic ($2\omega_1$); this case is known as harmonic generation. When $\overline{E}_1(\omega_1)$ and $\overline{E}_2(\omega_2)$ are at optical frequencies, ($\sim 10^{14}$ cps) as with laser light, $X^{NL}$ is known as the optical nonlinear susceptibility. In general $X^{NL}$ is a third-rank tensor. This tensor has all components equal to zero if the material has a center of inversion. In crystals which lack inversion symmetry, the nonvanishing elements are those of the piezoelectric tensor.

In the above case wherein $BaTiO_3$ is being switched between the paraelectric (centrosymmetric) and ferroelectric (non-centrosymmetric) states, the elements of the nonlinear susceptibility tensor are switched between zero and some finite value. What this means is that the crystal 32 in its paraelectric state will not generate a harmonic of the incident laser frequency. However, after being switched into the ferroelectric state, the crystal 32 is capable of generating the harmonic of the incident laser frequency. Therefore, the same conditions under which the Raman effect is turned on and off will turn the harmonic on and off. For a 1.06$\mu$m Nd laser, for example, the first harmonic wavelength occurs at 5300 A. This mechanism could also be utilized to put additional frequencies on a laser beam for the purpose of coding the beam. To maximize or minimize this effect, one can adjust the electric field applied to the crystal 32 which will alter the phase matching condition.

What is claimed is:

1. In a laser system of the type wherein an active laser element is energized to produce a laser beam of substantially one frequency, $\omega_1$, the improvement in the method of changing the frequency of said laser beam by a frequency $\omega_2$, comprising disposing a crystal of a single crystal structure, having paraelectric and ferroelectric states above and below a Curie point, respectively, in the path of said laser beam, maintaining said crystal in its paraelectric state at substantially constant temperature just above its Curie point, when the laser beam emerging from said crystal is to remain substantially unchanged in frequency, and applying a voltage of sufficient value across said crystal to drive it into its ferroelectric state and generate radiations of frequency $\omega_2$, when the laser beam emerging from said crystal is to have frequencies of $\omega_1 \pm \omega_2$.

2. In a laser system of the type described in claim 1, wherein said crystal is a single crystal selected from the group consisting of barium titanate, strontium tetanate, potassium niobate, and lead titanate.

3. In a laser system of the type described in claim 1, wherein said frequency $\omega_2$ is produced by the vibrational modes of said crystal, when Raman active, and is a characteristic value for said crystal.

4. In a laser system of the type described in claim 1, wherein said crystal has a cubic structure in its paraelectric state and a tetragonal structure in its ferroelectric state, and said crystal has inversion symmetry only in said cubic structure.

5. In a laser system of the type described in claim 1, wherein said crystal has a cubic axis, said laser beam is directed through said crystal substantially parallel to said cubic axis, and said voltage is applied transversely to said cubic axis.

6. In a laser system of the type described in claim 1, wherein said substantially constant temperature above the Curie point of said crystal is within a range of about 5° C of said Curie point for said crystal.

7. In a laser system of the type described in claim 1, wherein said frequency $\omega_2$ is produced by harmonic generation of said crystal in its ferroelectric state, and is equal to the frequency $\omega_1$.

* * * * *